United States Patent [19]

Williams et al.

[11] Patent Number: 4,679,098
[45] Date of Patent: Jul. 7, 1987

[54] VIDEO TAPE TRANSPORT SERVO FOR VARIABLE TAPE SPEED CONTROL

[75] Inventors: Marshall Williams, Fremont; David R. Rodal, Palo Alto, both of Calif.

[73] Assignee: Ampex Corporation, Redwood City, Calif.

[21] Appl. No.: 837,520

[22] Filed: Mar. 6, 1986

Related U.S. Application Data

[63] Continuation of Ser. No. 768,164, Aug. 20, 1985, abandoned, which is a continuation-in-part of Ser. No. 419,631, Sep. 17, 1982, abandoned.

[51] Int. Cl.⁴ .................... H04N 5/782; G11B 15/46
[52] U.S. Cl. ................................ 360/10.1; 360/10.3; 360/73
[58] Field of Search .............. 360/9.1, 10.2, 10.3, 360/10.1, 73, 77, 70

[56] References Cited

U.S. PATENT DOCUMENTS

| | | |
|---|---|---|
| 4,215,362 | 7/1980 | Ravizza .......................... 360/70 X |
| 4,261,020 | 4/1981 | Beeson et al. ...................... 360/73 |
| 4,287,538 | 9/1982 | Sakamoto et al. ................ 360/10.2 |
| 4,308,560 | 12/1981 | Ravizza .............................. 360/10.2 |
| 4,318,140 | 3/1982 | Shigeta .............................. 360/10.3 |
| 4,358,798 | 11/1982 | Hedlund et al. ...................... 360/73 |
| 4,393,415 | 7/1983 | Hurst .................................. 360/9.1 |

Primary Examiner—Robert L. Richardson
Attorney, Agent, or Firm—Roger D. Greer; Ralph L. Mossino; Joel D. Talcott

[57] ABSTRACT

A capstan servo for moving video tape with variable speed during playback controls the tape speed according to time period inputs. The input specifies the number of seconds per hour of program length, for example, that a segment of recorded video information is to be expanded or compressed compared relative to its normal real time playback length. The speed of tape transport during playback is varied by locking the reproduced control track vertical sync signal to a synthesized time adjustable reference signal.

12 Claims, 4 Drawing Figures

FIG_1

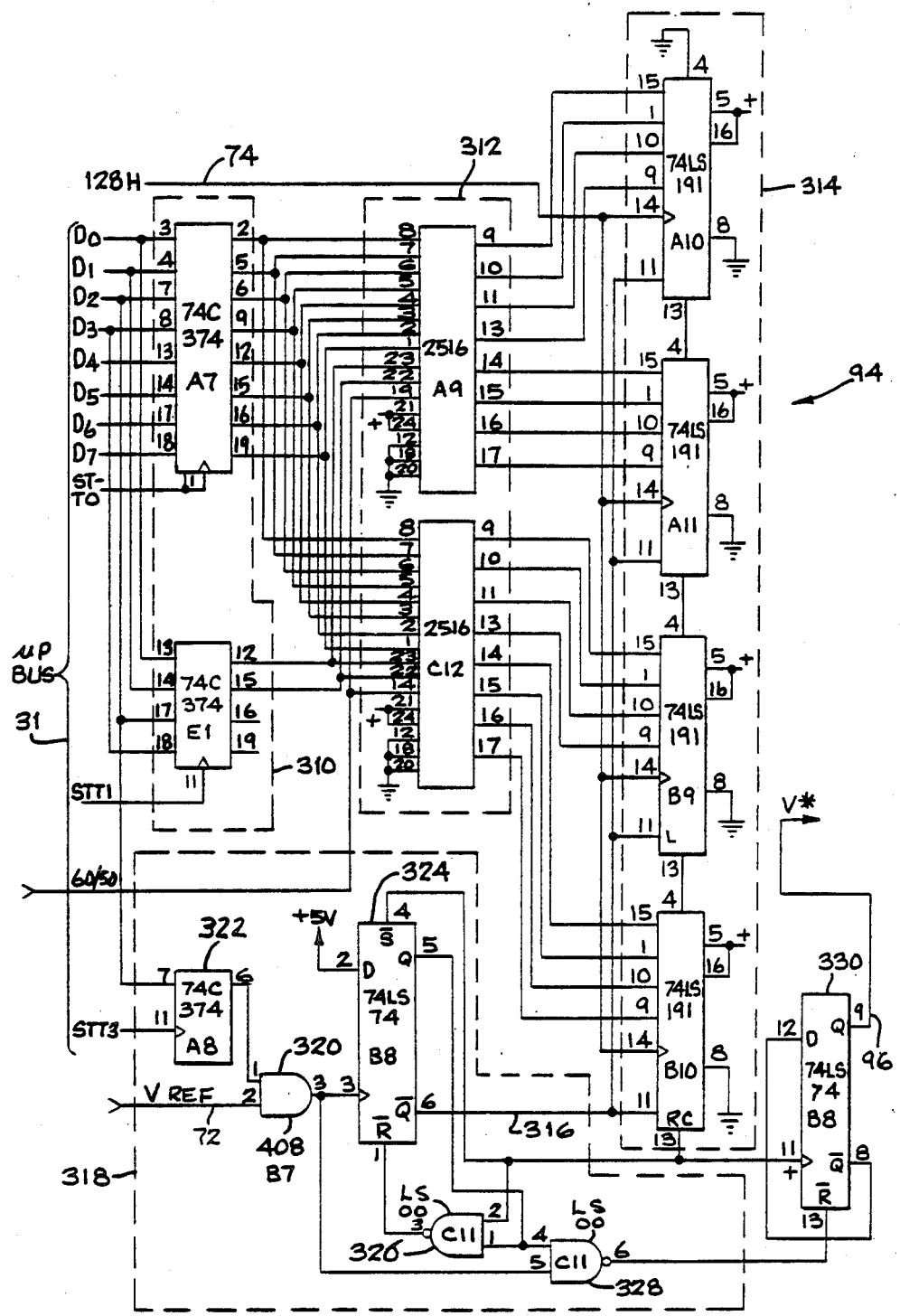
FIG_4

VIDEO TAPE TRANSPORT SERVO FOR VARIABLE TAPE SPEED CONTROL

This application is a continuation of U.S. application Ser. No. 768,164, filed Aug. 20, 1985, copending herewith, and now abandoned, which in turn is a continuation of U.S. application Ser. No. 419,631, filed Sept. 17, 1982, that was copending therewith, and now abandoned.

This invention relates generally to tape transport control systems for video tape recorders. More particularly, this invention relates to a video tape transport control system capable of effecting selective expansion or compression of the playback time of recorded video information.

BACKGROUND OF THE INVENTION

Video recording and reproducing apparatus, particularly apparatus that record and reproduce video information in conformance with broadcast standards are extremely complex, containing sophisticated electronic and mechanical components and systems. They require an extraordinary level of sophistication to provide the amount of control necessary to operate reliably in conformance with broadcast quality standards. Such apparatus accordingly have a number of servo systems to control their operation, including a servo system that controls the rotation of the rotatable video recording and reproducing transducers or heads, a servo system that controls the motors for driving the tape supply and take-up reels, a servo system that controls the correction of the timing of the reproduced video signal, usually called a time base corrector, and a capstan servo system that controls the speed at which the tape is transported. The servo systems often operate under microprocessor control.

Recently developed recording and reproducing apparatus include a head tracking position servo system which controls a movable element carrying the video reproducing head (or heads) mounted on a rotatable drum that also serves as a guide for the tape as it is transported along a helical path around the rotatable head during record and reproduce operations. The movable element is controlled to have the reproducing head follow a recorded video track in a manner permitting reproduction of broadcast quality special effects as when the tape is transported at a speed other than the normal speed at which it was transported during recording of the tracks of video information. During such operations, the head tracking position servo moves the head transversely with respect to the direction of the recorded video tracks so that the head follows each recorded track accurately and produces a quality signal, whether the tape is transported faster than normal record speed, resulting in a fast motion effect, or slower than normal record speed, resulting in a slow motion effect, or even when the transport of the tape is stopped, resulting in a stop motion (still frame or field) effect.

One very desirable feature that has not been available in prior art video tape recording and reproducing apparatus is the capability of providing asynchronous reproduction so that precise time expansion or compression of a segment of recorded video information, sometimes referred to herein as a program, can be reproduced within a shorter or longer interval than the real time interval of the segment. Time expansion or compression is achieved by altering the speed of the transport of the tape from the normal record and reproduce speed and occasionally repeating or skipping the reproduction of a recorded track to effect such expansion or compression.

When the tape speed is so altered, it is highly desirable to have the recording and reproducing apparatus servo locked to the system timing reference in order to provide accurate control of the playback time expansion and compression. Such servo locking is also highly desirable, if not essential, when a recorded video information that is compressed or expanded in time is reproduced by a video recording and reproducing apparatus other than that which recorded the information. With such servo locking, physical variances between transport mechanisms lead to undesirable time variations in the reproduced video information.

Also, if the tape is being transported at a speed other than the normal record and reproduce speed, a slight degree of mistracking occurs. For program expansion or compression, an occasional repeat or skip of the reproduction of a recorded field of video is required to avoid disturbances in the display of the information reproduced from the tape. Thus a head tracking position servo system is virtually a requirement for providing broadcast quality reproduction of the recorded video information under such circum- stances.

Systems are known that provide asynchronous playback of recorded video information to time compress or expand a segment of the video information without the video record and reproduce apparatus being servo locked to the system timing reference. In such systems, the amount of time compression or expansion is specified as a percentage of program figure that represents the desired percentage of time by which the program length is to be varied. Such systems are undesirable for altering the program length of broadcast video information, because the failure to servo lock the reproduction of the recorded video information to the system timing reference usually results in the alteration of the selected time expansion or compression of the program. The alteration is caused by the commonly occurring perturbations in the operation of video record and reproduce apparatus that introduce timing errors into the reproduced video information. Also, the known systems require computations by the operator to determine the correct percentage of program figure. The necessity of such computations allows the possibility of errors that result in erroneous altered program length, which is particularly unacceptable in broadcast applications where precise broadcast schedules must be maintained.

Accordingly, it is an object of the present invention to provide an improved servo system for the control of the transport of tape in a recording and reproducing apparatus, which reliably accomplishes accurate and effective asynchronous playback at tape transport speeds other than normal playback speed. Another object of the present invention is to provide an improved video tape transport control servo system suitable for asynchronous playback which permits an operator to specify the desired time compression or expansion of segments of video information precisely in time units without the necessity of computations. Yet another object of the present invention is to provide an improved video tape transport control servo system that eliminates interchange timing variations, i.e., timing variations resulting from the reproduction of video information by a video recording and reproducing apparatus other than the apparatus that recorded the video information.

Other objects and advantages will become apparent from the following detailed description accompanied by the attached drawings.

DESCRIPTION OF THE DRAWINGS

FIG. 4 is a circuit diagram of the controller portion of the capstan servo and control shown functionally in FIG. 3.

DESCRIPTION OF THE APPARATUS

A microprocessor may be utilized in an exemplary construction embodying principles of the present invention to control servos of video recording and reproducing apparatus and, by virtue of that control, to provide asynchronous playback of recorded video information, with the reproduction of the video information servo locked to the system timing reference. Thus, an operator located at the recording and reproducing apparatus itself, or remotely, if desired, can input a number indicating units of required time compression or expansion of a selected recorded program length or segment. For example, it is possible to compress the recorded program segment to provide an additional 10 or 20 seconds of time at the end of a program to facilitate insertion of additional commercials. The 10 or 20 second time compression is accomplished by merely transporting the tape at an appropriately higher speed so that a selected segment of recorded video information is reproduced in a shorter interval than that required to record the segment. This provides the additional 10 or 20 seconds for inserting additional program material without requiring the removal, by editing, of reproduced video information. Such time compression, or corresponding expansion, effects are accomplished very accurately because control track lock of the transport of the tape is maintained even though the tape is transported at a speed different from the normal reproduce tape speed. By maintaining control track lock, no deleterious variation in the transport of the tape occurs.

Figure 1:
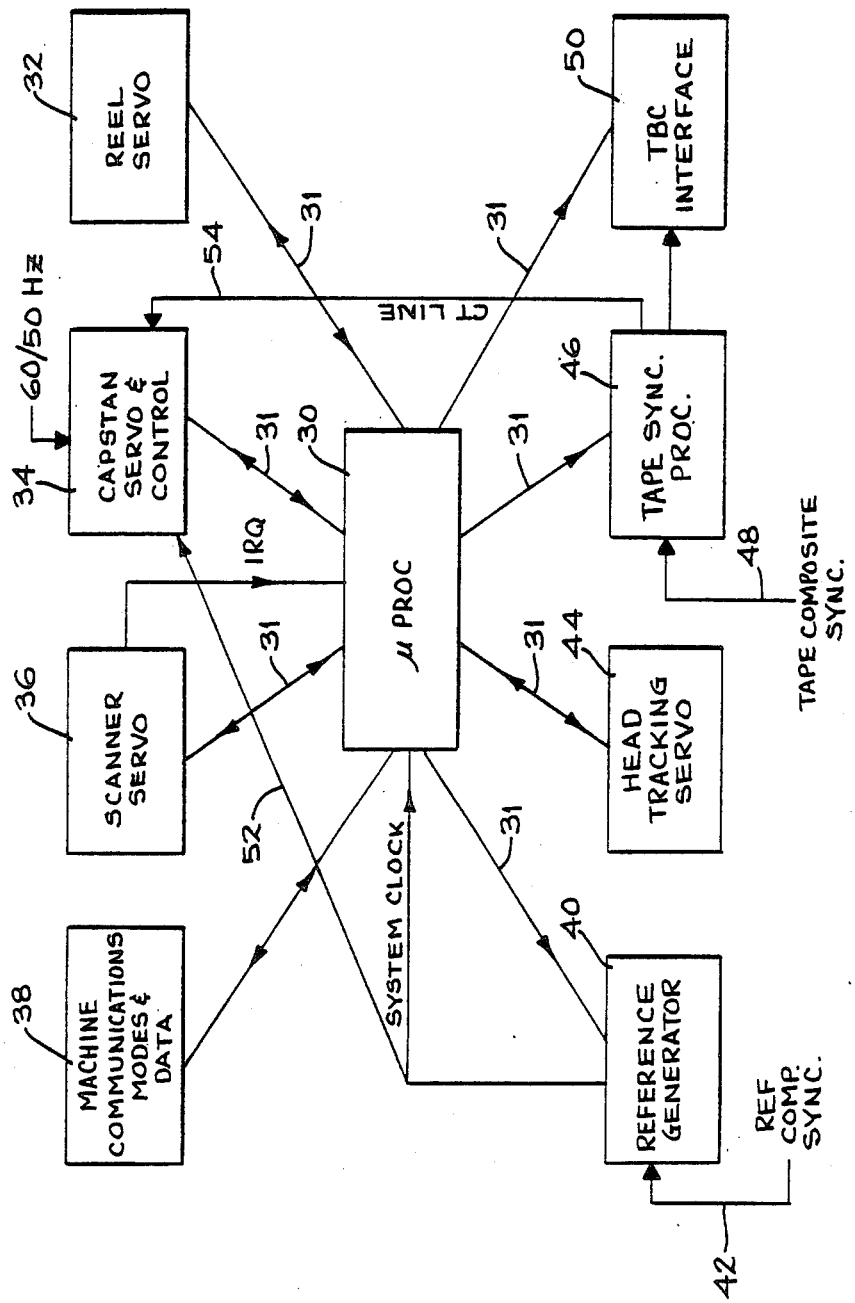
FIG. 1 is a functional block diagram illustrating a microprocessor controlled video reproducing apparatus locked to the system timing reference exemplifying the present invention.

Turning initially to the block diagram of FIG. 1, there is shown a microprocessor 30 which is interconnected by a data bus 31 with a reel servo 32, a capstan servo and control 34, which includes a tape speed override feature in accordance with the present invention, a scanner servo 36 and a machine communication and data interface 38, which controls the various modes of the recording and reproducing apparatus through operator manipulation of suitable machine operator controls.

The microprocessor 30 also interacts with a reference generator 40, which receives, as an input thereto, a system timing reference station composite sync signal via line 42. The reference generator generates system clocks, which clock the microprocessor 30, which in turn synchronizes the clock timing of the servos and other circuitry of the video recording and reproducing apparatus. The microprocessor 30 also interacts with an automatic head tracking position servo 44 and a tape sync processor 46, which has a tape composite sync signal input via line 48. The automatic head tracking position servo 44 functions to control the video head tracking position relative to the tape as the video information is reproduced therefrom. The tape sync processor 46 additionally provides a signal to a time base corrector interface 50, which operates to provide appropriate timing and control signals for use by a time base corrector. The time base corrector processes the timing and control signals to provide a broadcast quality video image having the requisite stability and vertical position with respect to system reference, as well as the correct chroma information. The processing varies in accordance with the reproducing mode of the apparatus.

The reference generator 40 provides system timing reference signals to the capstan servo and control 34 over timing lines 52, which includes a reference vertical sync, VREF, and a clock signal, 128H, at a rate of 128 times the reference horizontal sync frequency, both derived in a conventional fashion from the reference station composite sync signal present on line 42. The capstan servo and control 34 also receives control track signals over a CT line 54 reproduced from the tape and processed conventionally by the tape sync processor 46.

The apparatus is programmed to operate in various operating modes as is described in more detail in U.S. patent application Ser. No. 364,793 entitled Microprocessor Controlled Reproducing Apparatus Having Asynchronous Reproducing Capability, filed Apr. 2, 1982 by Kenneth Louth, assigned to the assignee of this application, abandoned in favor of continuation application Ser. No. 660,453 now Pat. No. 4,635,138, and incorporated herein by reference. Once the video recording and reproducing apparatus is initialized, a mode is selected, which may include stop, record, variable motion reproduce, stop motion (still frame or field) reproduce, ready, normal play, tape shuttle and tape speed override.

Mode selection is made by an operator with the aid of an interactive CRT terminal included in the machine communication and data interface 38. Upon selection of the tape speed override, or TSO, mode, the interactive CRT terminal requests the operator to specify whether the desired mode is a time expansion or a time compression mode. Upon selection of one of these modes, the interactive CRT terminal requests the operator to input, in real program time, the number of seconds of change per hour of program desired. Alternatively, in another embodiment, the operator is permitted to specify the total real time of the program to be reproduced in the selected mode and the total number of seconds of program length change desired. In either embodiment, however, the operator input is made in units of time, whether it be in seconds, minutes, hours or some combination of such or other time units.

If the input specifies both total real program time and total seconds of program length change desired, the microprocessor 30 is programmed to reduce the two numbers to a standard basis, e.g., seconds change per hour of real program time. The numerical value of the desired change, expressed in the standard basis, is then transmitted over the data bus 31 to the capstan servo and control 34 where it is stored as a standardized compression or expansion modified time period signal. The sign associated with the modified time period signal is assigned according to a pre-established convention depending, respectively, whether expansion or compression is selected by the operator. The capstan servo and control 34 is accordingly provided with input means, such as a multibit strobed flip-flop storage arrangement, for the input of the modified time period signal.

The TSO feature can only be selected when video recording and reproducing apparatus is in the playback mode of operation. Ordinarily, when in that mode, control track signals are reproduced from the tape and used for synchronization of the reproduction of the video information relative to the system timing reference. The control track signals are recorded on the tape in a fixed position relationship relative to the recorded video information to indicate the location, including the start, of each field of video information recorded on the tape. The rate at which control track signals are reproduced also indicates, with high precision, the speed of the transport of the tape by the apparatus.

Control track servo lock in the embodiment illustrated in FIGS. 1-4 is obtained with the assistance of a programmable counting means; such as a binary counter. The counter is clocked by the 128H high rate clock signal generated from reference station composite sync signal by the reference generator 40 and provided to the counter over line 52. Additionally, during normal operation without TSO, the counter will be synchronized with a vertical sync rate reference signal, commonly in the form of a pulse, obtained from the reference station composite sync signal and provided by the reference generator 40. Accordingly, the counter can be operated to provide at its carry output a signal substantially in phase with the vertical sync rate reference signal, which may be determined by either the rising or falling, i.e., complementary, transitions of the pulse signal. In the preferred embodiment of the present invention, the rising transition of the reference vertical sync rate signal is selected as the phase reference time.

When the TSO mode is activated by a signal on a sync/async select TSO line, the synchronizing vertical reference signals are blocked from the counter and the counter presets in accordance with the stored modified time period signal. The counter thereafter is clocked by the high rate 128H signal to provide at its carry output a signal whose phase is determined by its preset, hence, modified time period signal. The counter's output will in general, therefore, no longer be in phase with vertical sync rate reference. The first carry output pulse from the counter when entering this operating mode will, however, be arranged to occur almost exactly simultaneously with the phase reference determining transition of the vertical sync rate reference signal. As a consequence there will be no noticeable video or audio disturbance when the TSO operating mode is entered.

Presetting of the counter requires a conversion of the stored modified time period signal to a binary number, which is placed on the counter data pins. The binary number is such that when the modified time period signal is zero, i.e., no timing expansion or compression, the output of the counter is at the studio vertical reference frequency and phase. Conversion may be conveniently accomplished with the aid of a read only memory, or ROM. If, for example, a capability is desired to effect program time changes of up to ±511 seconds per hour of real time program length in 1 second increments, 1024 ROM addresses are required. Furthermore, it may be desirable to have a ROM useable for both NTSC and PAL television signal broadcast standards; 2048 ROM addresses provide this capability. Hexadecimal ROM addresses 000 to 3FF may accordingly correspond, respectively, to NTSC modified program time changes of −511 to +511 seconds per hour of real time program length. Addresses 400 to 7FF correspond, respectively, to the same range of PAL modified program time changes.

The contents of ROM storage, therefore, comprise presettable counts, or index quantities, at each of the foregoing addresses. The presettable counts may be determined from the formula $$D = X + (K)(R) \qquad (1)$$

where D is the presettable count stored in ROM, X and K are constants to be described, and R is the modified time change in seconds. In the exemplary embodiment described herein, X has the values 16,800 and 20,000 for NTSC and PAL, respectively. The constant, K, correspondingly, has the values 42/9 and 50/9. It is readily seen that R is just the ROM address less a displacement value according to whether a time compression or expansion is to be performed and whether the video information signal being reproduced from tape is a NTSC or PAL television signal. The presettable count D, which is representative of the selected modified program time change, is determined by a 16 bit binary number in the exemplary embodiment and is, therefore, resolvable to one part in about 64,000.

When the TSO mode is activated, therefore, the presettable count from an appropriate memory address is loaded into the binary counter. The counter repeatedly counts downward from the presettable count, issuing a carry pulse each time its count reaches zero. The carry pulse then generates a frequency controllable synthesized vertical sync signal which, upon entering the TSO mode, is essentially in phase with the phase reference determining transition of the reference vertical sync signal. After TSO activation, the controllable synthesized vertical sync signal has a frequency corresponding to the desired amount of program time expansion or compression.

The controllable synthesized vertical sync signal assists in achieving control track lock through its use in an appropriate error detecting means that compares its phase to that of the control track signal reproduced from the tape. The output of the error detecting means is an error signal indicating the phase and frequency difference between the controllable synthesized vertical sync signal and the reproduced control track signal, and is coupled to a conventional capstan drive motor servo for use in determining the capstan drive signal provided to the capstan motor. The capstan drive motor tachometer servo responsively causes the capstan motor, hence, transport of the tape to speed up or slow down to keep the aforementioned phase and frequency difference represented by the error signal substantially equal to zero.

Figure 2:
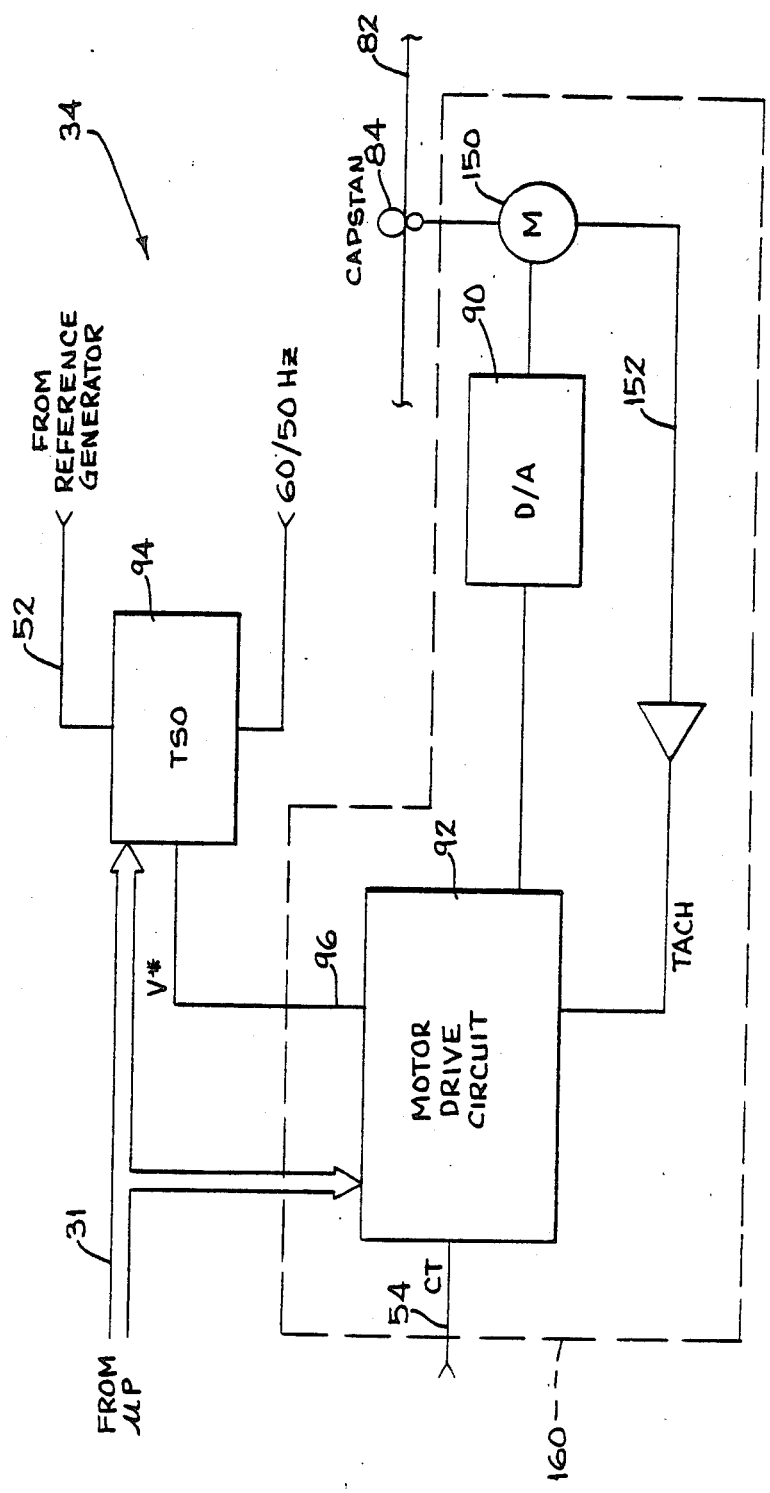
FIG. 2 is a functional block diagram of the capstan servo and control shown as a block in FIG. 1.
Figure 3:
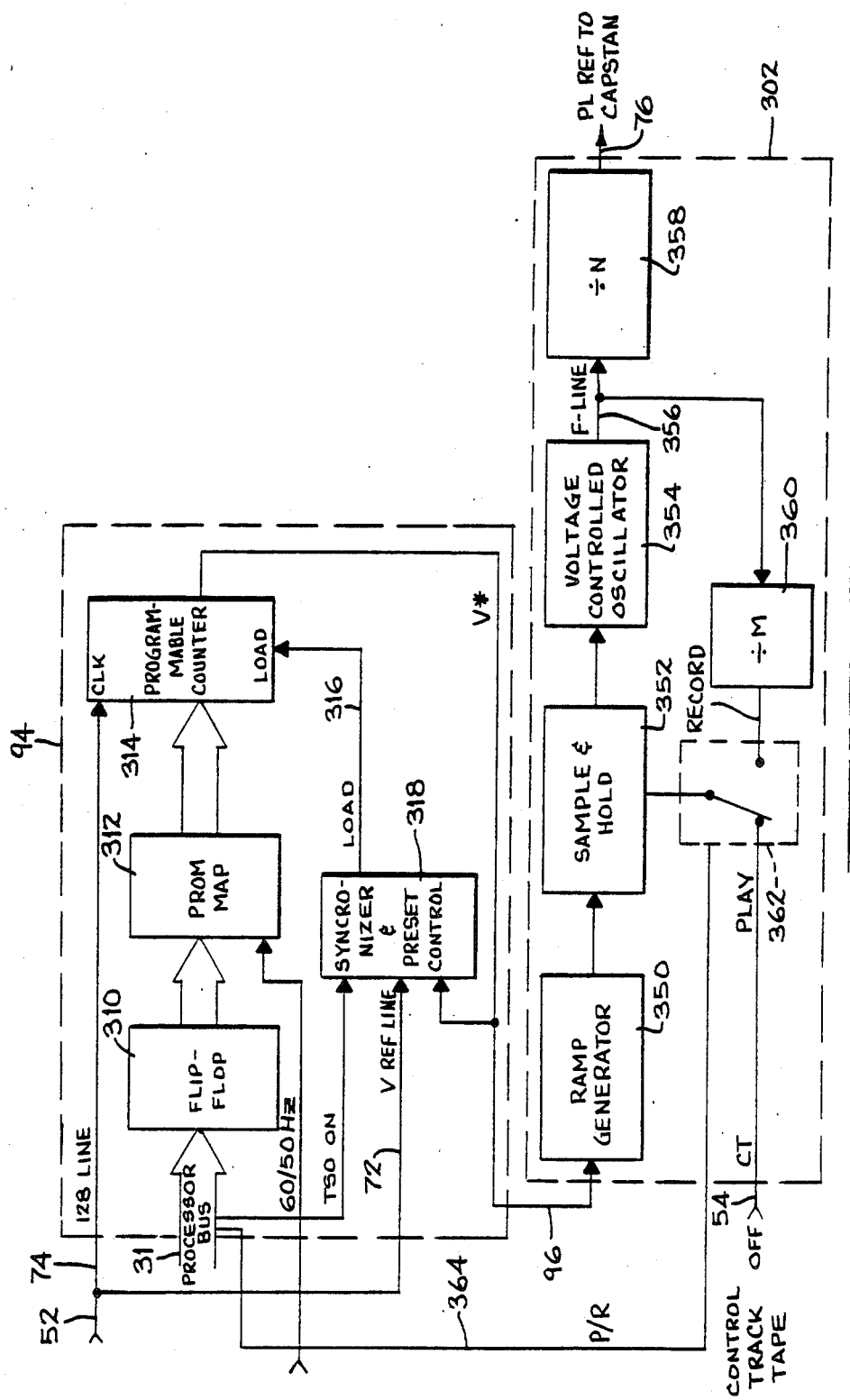
FIG. 3 is a functional block diagram of the capstan servo and control shown in FIG. 2.

An exemplary specific construction embodying the foregoing principles may be seen in more detail by reference to FIGS. 2-4.

As shown in FIG. 2, the microprocessor exerts supervisory control over the capstan servo and control 34. FIG. 2 illustrates an idealization of a tape 82 driven by a capstan 84 powered by a motor 150, which in the specific exemplary construction is a permanent magnet DC motor. The motor speed and direction is determined by the output of a current source 90 featuring digital to analog conversion capability. The digital data to the current source 90 is provided by a motor drive circuit 92 responsive to operating mode selection signals on line 364 (FIG. 3) of the microprocessor data bus 31 and speed control information from a TSO circuit 94 transmitted on a V* line 96. A capstan TACH line 152 from a capstan tachometer operatively associated with the motor 150 and the CT line 54 from the control track reproduce head operatively arranged to reproduce control track signals recorded on the tape 82 are coupled to the motor drive circuit 92 to form a servo feedback loop, thereby making the motor, hence, tape speed responsive to the phase and speed data provided on the V* line 96. The motor drive circuit 92 and motor 150 together with their associated connections thereby comprise a motor drive servo 160.

The reference timing lines 52 carry the vertical sync related signal on a VREF line 72 and the 128H high rate clock timing signal on a 128H line 74, as may be seen in FIG. 3. The vertical sync and horizontal line frequencies are different according to whether the system is operating in a 525 line NTSC mode or a 625 line PAL mode. Thus, the VREF line 72 carries a signal with a frequency of 59.94 Hz and 50.0 Hz in the NTSC and PAL modes, respectively. Correspondingly, the 128H line 74 carries signals with a frequency of 2.013986 MHz and 2.0 MHz in the NTSC and PAL modes, respectively. The selection between the NTSC and PAL operating modes is made by an operator controlled signal placed on the 60/50 Hz line extending to the TSO circuit 94.

The TSO circuit 94 is shown functionally in FIG. 3. It is comprised generally of a timing generator that cooperates with a control track error signal generator 302 that provides a tape speed related signal PLREF on line 76 coupled as the reference to the aforementioned capstan drive motor tachometer servo. The timing generator 94 receives at its input the high rate 128H clock on the line 74 and the reference vertical sync related signal on line 72. It responsibly provides a V* timing signal on line 96 connecting the timing generator with the PLREF signal generator 302. The V* signal is the controllable vertical sync signal of the embodiment, either related to the reference vertical sync related signal or the modified program time related signal provided by PROM memory 312, and is provided under all conditions of operation, whether or not expansion and compression of the program time is performed. When expansion or compression is not to be performed, the V* signal is related to the reference vertical sync related signal, which is coupled to the TSO circuit over the line 72. The PLREF signal generator 302 provides the PLREF signal on the line 76 to control the aforementioned capstan drive motor tachometer servo to cause the tape 82 (FIG. 2) to be transported at the normal speed.

The TSO or timing generator 94 includes an array of flip-flops 310 outputting 10 bits of data to the address pins of the PROM memory 312, which in turn outputs 16 bits of data to the data pins of a programmable counter 314. The bits of data provided by the PROM memory 312 correspond to either a number selected to represent the reference sync related signal or a number related to the modified program time, as will be described in more detail with reference to FIG. 4. The array of flip-flops 310 provides storage for the digitized modified time period signals transmitted from the microprocessor 30 (FIG. 1) over data bus 31. The modified time period signals are transmitted in the form of 10 bits of data identifying addresses in the PROM memory 312. The embodiment illustrated in FIGS. 2-4 employs an 8 bit microprocessor 30, which necessitates clocking in the 10 bit address data in 2 stages, using data lines D0-D7 and strobe lines STT0 and STT1. The PROM memory 312 is also addressed by an operator controlled signal placed on the 60/50 Hz line, which indicates whether the video recording and reproducing apparatus is arranged to operate in the NTSC or PAL operating mode. For each operating mode, a different portion of the PROM memory is addressed. As may be seen with reference to FIG. 4, TSO 94 is disabled and enabled by the output at pin 6 of a flip-flop 322 according to whether a logical high or a low signal at 322-7 is clocked by a rising strobe transition on strobe line SST3 extending to flip-flop input 322-11. Upon the occurrence of the strobing transition, the data present on data line D2 of the data bus 31, hence at input 322-7 of flip-flop 322, is stored in the flip-flop. The strobe lines STT0 through STT3 are enabled at the appropriate times by an address decoder associated with the microprocessor 30 (FIG. 1) to effect the storage of data on the data bus 31 in the appropriate flip-flops of the array 310 and 322.

The Q output at pin 9 of flip-flop 330 provides the tape speed control signal V* on line 96 in response to clocking of the flip-flop 330 by the counter 314. In the embodiment illustrated in FIGS. 2-4, the counter 314 is loaded to a selected number provided by the PROM memory 312 in accordance with the address signal stored in the array of flip-flops 310, and counts down to zero in response to the 128H clock signal on line 74. Each time the counter 314 reaches a count of zero, the flip-flop 330 is clocked to generate pulse, which forms the tape speed control signal on line 96. The loading of the counter 314 is controlled at counter load pin 314-11 by load line 316 extending from the output of a synchronizer and present control 318. As briefly discussed hereinbefore, the capstan servo controller or TSO 94 functions in two modes. In one mode, the counter 314 is synchronized to the reference vertical sync signal on line 72 to provide a speed control signal V* on line 96 at a phase and frequency corresponding to the normal record and reproduce speed of tape transport. In its other mode, the counter 314 effects the generation of a speed control signal V* on line 96 at a phase and frequency that results in the transport of the tape at a speed other than normal in accordance with the amount of program expansion or compression selected by the operator. In this other mode, the reference vertical sync signal is blocked from synchronizing the counter 314 after the mode is entered by a logical low signal provided to the input pin 1 of and AND-gate 320 by virtue of the presence of a TSO mode enable signal being present on data line D2 of the data bus 31 at the time of occurrence of the strobing transition on strobe line SST3 extending to clock input 322-11 of flip-flop 322.

When TSO 94 is disabled, the microprocessor 30 outputs a number to the array of flip-flops 310 corresponding to a normal tape speed (i.e., no modification of program length) address in the PROM memory 312. It also outputs a high to the flip-flop 322 via data line D2 of the data bus 31. The PROM memory 312 responsively outputs a number on the data pins of counter 314 corresponding to a zero value of R in Eq. (1). Since the AND-gate 320 is not blocked by the flip-flop 3-22, the first rising transition of the reference vertical sync related signal on line 72 is passed through the AND-gate 320 and following flip-flop 324 to clock a low onto the counter load pin 314-11, loading the counter 312 with the number output by the PROM memory 312. Immediately following this clocking of the counter 312, the output pin 3 of NAND-gate 326 goes low by virtue of its input pin 1 receiving a high logic level signal from the output pin 5 of the flip-flop 324. This resets flip-flop 324 and enables counter 314. The same rising reference vertical sync related signal transition also activates NAND gate 328 to provide a low logic level signal at its output pin 6, which is coupled to reset flip-flop 330 to cause a logical low to be placed on the V* line 96. Thus, the falling transition of the V* signal provided to the PLREF signal generator 302 (FIG. 3) over line 96 is synchronized to the occurrence of the rising transition of the reference vertical sync related signal on line 72. Following this enable, the counter 314 counts down from the number received on its input data pins until it reaches zero, at which time a low transition will occur on the counter output 314-13. The time required for the countdown is arranged as nearly as possible to be one-half the time between successive reference vertical sync related signal rising transitions on line 72. After counting to zero, the low transition generated by counter 314 at its output pin 3 is coupled to set flip-flop 324. Setting the flip-flop 324 causes the counter 314 to reload the number provided at its input data pins by the PROM memory 312 in preparation of its countdown once more. Setting of the flip-flop 324 also clocks the flip-flop 330 to cause the V* line 96 to go high.

It will be appreciated that if falling transitions on the counter output 314-13 are not exactly in synchronization with the rising transitions of the reference vertical sync related signal on line 72, then a rising transition on line 72 will cause the programmable counter 314 to reload and restart its countdown while simultaneously driving the output of the counter 314 low. In this way, the falling transitions on the V* line 96 are maintained in substantial synchronization with the rising transitions of the reference vertical sync related signal on line 72.

TSO 94 is enabled when a logical low level signal is placed on line D2 of data bus 31 and the microprocessor 30 provides a rising strobe transition on strobe line SST3 that clocks a logical low signal onto the output 322-6 of flip-flop 322, which disables AND-gate 320 to isolate flip-flop 324 from line 72. At about the same time, the microprocessor provides a strobing transition on strobe line SST0 that clocks a new modified time period signal into the array of flip-flops 310. When the counter 314 issues its next end of count output on its output 322-13 after TSO 94 is enabled, the new index quantity from the PROM memory 312 is loaded into the counter. The counter then counts a time period determined by the new index quantity from the PROM memory.

It is important to appreciate that the change in the operating condition of the counter 314 from a normal vertical sync signal output condition during an unmodified program length operating mode condition (when the TSO 94 is enabled) to a controllable synthesized vertical sync signal output condition during a modified program length operating mode condition (when the TSO 94 is enabled) is smooth. The mode transition occurs one count after a rising transition on the VREF line 72, thereby substantially preserving the phase relationship between the reference vertical sync related signal and the synthesized vertical sync signal when the mode transition occurs. The V* signal is accordingly synchronized to the occurrence of the vertical sync signal contained in the video information signal being reproduced from the tape 82 (FIG. 2) at the time the mode transition is made. The flip-flop 330, which divides the output of the counter 314 by two, provides the desired symmetrically shaped square wave output on the V* line 96 at the field rate frequency of operation of the video record and reproduce apparatus.

Referring again to FIG. 3, the V* signal from the timing generator or TSO 94 is provided to the control track error signal generator 302, which includes a ramp generator 350 whose ramp output is coupled to the input of a sample and hold circuit 352. The V* signal resets the ramp generator 350, which responsively initiates a ramp voltage having a sawtooth wave form. When the apparatus is in the playback mode of operation, each transition signal on the CT line 54 activates the sample and hold circuit 352, which responsively samples the voltage of the ramp signal generated by the ramp generator 350. It is evident that the sampled voltage will be proportional to the time delay between the transition on the V* line 96, which is a downward transition in the illustrated embodiment initiating the generation of the sawtooth ramp voltage by the ramp generator 350, and a rising transition of the control track signal on the CT line 54, which initiates the sampling of the generated ramp. Thus, the sample and hold voltage comprises an error signal responsive to the phase difference between the CT control track signal reproduced from the tape 82 (FIG. 2) and the V* signal on line 72. When the V* signal is synchronized to the occurrence of the CT control track signal reproduced from the tape 82, a zero error condition is output on the PLREF line 76. When V* signal is out of phase relative to the CT control track signal, a correcting error signal that is indicative of the phase difference is output on the PLREF line 76, which causes the tape transport speed to change to the speed corresponding to the new V* signal on line 96.

The output of the sample and hold circuit 352 is applied to the voltage controlled oscillator 354, which outputs a signal at a frequency of 32H line 356 when the output of the sample and hold circuit corresponds to zero error. The output of the voltage controlled oscillator is coupled by the F-line 356 to a divide by N circuit 358, where it is divided by 160 under normal playing conditions. Thus, in case of an NTSC operating mode, the divide by N circuit 358 will output a corresponding signal at a nominal frequency of approximately 3.15 KHz, whereas in the PAL operating mode the nominal frequency is 3.125 KHz. The output of the divide by N counter comprises the control track error signal, or PLREF signal, on the PLREF line 76 extending to the capstan drive motor tachometer servo portion of the capstan servo 160 (FIG. 2). Of course, it is understood the frequency of the signal on the PLREF line 76 will vary up or down in accordance with error reflected in the output voltage provided by the sample and hold circuit 352.

The 32H frequency signal is also fed to a divide-by-M circuit 360, which responsively divides it down to the vertical sync rate. The division is accordingly by a factor of 8400 in the NTSC operating mode and 10,000 in the PAL operating mode. The output of the divide-by-M counter is coupled to a switch 362 controlled by a play/record select signal, P/R, on line 364. When the recording and reproducing apparatus is in the record mode of operation, the P/R signal activates the switch 362 to couple the output of the divide-by-M counter 360 to the sample and hold circuit 352 in place of the control track signal on the CT line 54. It is readily seen that in the record mode the divide-by-M circuit forms a feedback loop to control the frequency of the oscillator 354 in accordance with the reference vertical sync related signal provided on the V* line 96. When the apparatus is in the playback mode of operation, the switch is activated by the P/R signal on line 364 to couple the sample and hold circuit 352 to receive the control track signal reproduced from the tape 82 (FIG. 2) and provided on the CT line 54.

It will of course be understood that modification of the present invention and its various aspects would be apparent to those skilled in the art, some being apparent only after study and others being a matter of routine design. For example, the described embodiment is adapted for use with a DC permanent magnet motor in the capstan servo. However, this is not a necessary feature of the invention. In an alternative embodiment, one might choose alternate means to drive the tape. Furthermore, a control track rate signal synthesized from the vertical sync signal extracted from the reproduced video information signal could be used in the motor drive servo 160 in place of the control track signal. Apparatus for synthesizing a control track rate signal from synchronizing signals included in video information reproduced from a magnetic tape is described in U.S. patent application Ser. No. 418,865, entitled Synthetic Control Track Signal Producing Apparatus For Video Tape Machines, filed on the same date as this application, by David R. Rodal, assigned to the assignee of this application and incorporated herein by reference which was abandoned in favor of continuation application Ser. No. 736,483. It is to be appreciated, therefore, that the scope of the invention should not be limited by the particular embodiment and specific construction herein described, but should be defined only by the appended claims and the equivalents thereof.

What is claimed is:

1. A capstan servo for moving video tape with variable speed during reproducing, said capstan servo being capable of detecting and responding to a recording control track signal, a stable reference vertical signal, a sync/async select line, and a high rate clock, said servo comprising:
   input means for inputting a specified time period to said capstan servo;
   programmable counting means clocked by the high rate clock for providing a controllable vertical sync output signal for use in providing a closed loop control track locked tape drive, said counting means having a synchronous mode of operation using the stable reference vertical signal as a synchronizing input, having means to disable said synchronizing input, and having a free-wheeling mode of operation when said synchronizing input is disabled, the enabling and disabling being responsive to tne state of the sync/async line;
   processing means for programming said counting means with a presettable count, said presettable count determining the frequency of said controllable vertical sync signal;
   tape speed override means for enabling and disabling said synchronizing input in response to the signal carried on the sync/async select line; and
   conversion means for converting said specified time period to said presettable count and providing said presettable count to said processing means.

2. A capstan servo according to claim 1 comprising driver means responsive to said controllable vertical sync output signal and to the recording control track signal for controlling the video tape speed in accordance with the frequency of said controllable sync output signal.

3. A capstan servo according to claim 2 wherein said driver means includes means for generating an error signal monotonically related to phase differences between said controllable vertical sync output signal and the recording control track signal.

4. A capstan servo according to any of claims 1 through 3 wherein said conversion means includes a memory containing a conversion table.

5. A capstan servo according to any of claims 1 through 3 wherein said programmable counting means includes means for making a smooth transition from synchronous to asynchronous operation.

6. A capstan servo according to any of claims 1 through 3 wherein said processing means includes a microprocessor.

7. A capstan servo according to claim 6 wherein said programmable counting means includes a programmable binary counter.

8. A capstan servo according to claim 4 wherein said input means and said conversion means are adapted to a specified time period standardized to units expressed as seconds change per hour of running time.

9. A reference locked tape speed override for use in a video tape reproducing machine having at least one servo controlled drive motor, a stable vertical reference signal, and a control track signal generated from a played back tape, comprising:
   control means for inputting into the tape speed override a playback expansion or a compression amount expressed in specific time units;
   conversion means responsive to said amount for converting said amount to an index quantity;
   timing means responsive to said index quantity for generating an adjustable vertical reference signal;
   gating means for replacing the stable vertical reference signal with said adjustable vertical reference signal without an initial substantial change of phase; and
   driver means responsive to the adjustable vertical reference and the control track signal for generating a control signal for controlling the drive motor servo to control the motor speed.

10. A tape speed override according to claim 8 wherein said driver means includes a ramp generator and sample and hold circuit for comparing phase differences between the control track signal and the adjustable vertical reference signal to generate output voltages substantially proportional to said phase differences.

11. A tape speed override according to claim 9 wherein said output voltages govern the frequency of a voltage controlled oscillator and said oscillator output is substantially said signal.

12. A capstan servo for moving video tape during recording and reproduction, said capstan servo being capable of detecting and responding to a recording control track signal, a reference vertical signal, and a play/record switch comprising:
   a drive motor servo,
   drive signal means for providing a drive signal to said drive motor servo to indicate a direction and speed of tape motion, and
   control means enabled by the play position of the play/record switch for controlling said drive signal means in response to the control track signal and the reference vertical signal to provide control track locked drive of the tape, said control means being enabled by the record position of the play/record switch to control said drive signal means in response to said drive signal and the reference vertical to drive the tape at a speed indicated by the reference vertical.

* * * * *

UNITED STATES PATENT AND TRADEMARK OFFICE
CERTIFICATE OF CORRECTION

PATENT NO. : 4,679,098
DATED : July 7, 1987
INVENTOR(S) : Marshall Williams and David R. Rodal It is certified that error appears in the above-identified patent and that said Letters Patent is hereby corrected as shown below:

Column 12, line 47, change "8" to --9--.

Signed and Sealed this

Thirteenth Day of June, 1989

Attest:

DONALD J. QUIGG

*Attesting Officer*  *Commissioner of Patents and Trademarks*